United States Patent
Umeda et al.

(10) Patent No.: US 12,526,783 B2
(45) Date of Patent: Jan. 13, 2026

(54) REPORTING REGIONS OF LOW OR ZERO MAXIMUM SENSITIVITY DEGRADATION

(71) Applicant: Nokia Technologies Oy, Espoo (FI)

(72) Inventors: Hiromasa Umeda, Tokyo (JP); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 324 days.

(21) Appl. No.: 18/498,598

(22) Filed: Oct. 31, 2023

(65) Prior Publication Data
US 2024/0155584 A1    May 9, 2024

Related U.S. Application Data (60) Provisional application No. 63/382,578, filed on Nov. 7, 2022.

(51) Int. Cl.
*H04W 72/0453* (2023.01)
*H04W 72/54* (2023.01)

(52) U.S. Cl.
CPC ....... *H04W 72/0453* (2013.01); *H04W 72/54* (2023.01)

(58) Field of Classification Search
CPC .. H04W 72/0453; H04W 72/54; H04L 5/001; H04L 5/006; H04L 5/0073; H04L 5/0096
See application file for complete search history.

(56) References Cited

U.S. PATENT DOCUMENTS

| | | | |
|---|---|---|---|
| 8,837,422 B2* | 9/2014 | Chen | H04L 5/0032 370/339 |
| 2013/0021954 A1* | 1/2013 | Montojo | H04L 5/16 370/295 |
| 2022/0116890 A1* | 4/2022 | Zacharias | H04W 72/1263 |
| 2022/0338188 A1* | 10/2022 | Jain | H04W 72/56 |

(Continued)

FOREIGN PATENT DOCUMENTS

| | | | | |
|---|---|---|---|---|
| DE | 112021004406 T5 * | 7/2023 | | H04W 4/02 |
| EP | 4625866 A1 * | 10/2025 | | H04W 72/231 |

OTHER PUBLICATIONS

3GPP TS 38.101-3 V15.3.0 (Sep. 2018) Technical Specification 3rd Generation Partnership Project; Technical Specification Group Radio Access Network; NR; User Equipment (UE) radio transmission and reception; Part 3: Range 1 and Range 2 Interworking operation with other radios (Release 15) (Year: 2018).*

(Continued)

*Primary Examiner* — Michael A Keller
(74) *Attorney, Agent, or Firm* — Nokia Technologies Oy (57) ABSTRACT

Techniques of wireless communications include enabling the UE to indicate region in the channel bandwidth of a band combination where the MSD is zero or small. The indication defines a frequency boundary where MSD is "low" (e.g., small or zero dB) and MSD is "high" (e.g., >0 dB), and may contain a frequency offset from the centre of the MSD originating source to the boundary. The UE indication may be given as part of UE capabilities (e.g., UE indicates per BC the MSD region and MSD value within the region), or as a (Continued)

part of UE response to a network request (e.g., network requests UE to report MSD values for a given band combination and UE provides the information), with a UE capability for supporting such request-response mechanism.

18 Claims, 9 Drawing Sheets

(56) References Cited

U.S. PATENT DOCUMENTS

2023/0254778 A1* 8/2023 Ioffe ............... H04W 52/241 370/318
2025/0081173 A1* 3/2025 Umeda ............... H04W 8/24

OTHER PUBLICATIONS

ETSI TS 138 101-1 V15.2.0 (Jul. 2018), 5G; NR; User Equipment (UE) radio transmission and reception; Part 1: Range 1 Standalone (3GPP TS 38.101-1 version 15.2.0 Release 15) (Year: 2018).*
3GPP TS 38.521-3 V17.2.0 (Sep. 2021) Technical Specification 3rd Generation Partnership Project; Technical Specification Group Radio Access Network; NR; User Equipment (UE) conformance specification; Radio transmission and reception; Part 3: Range 1 and Range 2 Interworking operation with other radios (Year: 2021).*
ETSI TS 138 307 V16.6.0 (Apr. 2021), 5G; NR; Requirements on User Equipments (UEs) supporting a release-independent frequency band (3GPP TS 38.307 version 16.6.0 Release 16) (Year: 2021).*
3GPP TS 38.521-1 V17.5.0 (Jun. 2022), Release 17 (Year: 2022).*
3GPP TS 38.306 V17.0.0 (Mar. 2022) Technical Specification 3rd Generation Partnership Project; Technical Specification Group Radio Access Network; NR; User Equipment (UE) radio access capabilities (Release 17) (Year: 2022).*
3GPP TSG-RAN WG4 Meeting #105, R4-2220106, Toulouse, France, Nov. 14-18, 2022 (Year: 2022).*
"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.
"3rd Generation Partnership Project, Technical Specification Group Radio Access Network; NR; User Equipment (UE) radio transmission and reception; Part 3: Range 1 and Range 2 Interworking operation with other radios (Release 17)", 3GPP TS 38.101-3, V17.7.0, Sep. 2022, pp. 1-1131.
"Improving PC2 MSD for EN-DC and UL CA", 3GPP TSG-RAN WG4 #97-e, R4-2016440, Agenda: 10.20.2, Qualcomm Incorporated, Nov. 2-13, 2020, pp. 1-5.
"Improved MSD for CA and DC", 3GPP TSG-RAN #92-e, RP-211305, Qualcomm Incorporated, Jun. 14-18, 2021, 5 pages.
"Moderator's summary for discussion [RAN94e-R18Prep-22]", 3GPP TSG-RAN Meeting #94-e, RP-212682, Agenda: 8A.4, Huawei, Dec. 6-17, 2021, pp. 1-243.
"Possible approaches to improve MSD", 3GPP TSG-RAN WG4 Meeting #104-e, R4-2212093, Agenda: 11.6.4.1, Nokia, Aug. 15-26, 2022, 11 pages.
"Feasibility study on amount of MSD improvement", 3GPP TSG-RAN WG4 Meeting #104-bis-e, R4-2215792, Agenda: 6.6.4.1, Nokia, Aug. 15-26, 2022, 9 pages.
"Lower MSD signalling and the effects of the introduction", 3GPP TSG-RAN4 Meeting #104-bis-e, R4-2215382, Agenda: 6.6.4.2, Nokia, Oct. 10-19, 2022, pp. 1-13.
"B3+B42 A2 CA combination", 3GPP TSG-RAN WG4 #73, R4-147741, Agenda: 7.25.1, Qualcomm Incorporated, Nov. 17-21, 2014, pp. 1-4.
"Views on lower MSD signaling", 3GPP TSG-RAN WG4 Meeting # 106bis-e, R4-2304094, Agenda: 5.5.2.3.1, Nokia, Apr. 17-26, 2023, pp. 1-7.
"3rd Generation Partnership Project; Technical Specification Group Radio Access Networks; Lower MSD for inter-band CA/EN-DC/DC combinations (Release 18)", 3GPP TR 38.881, V0.4.0, Apr. 2023, pp. 1-54.
"TR handling and TP on possible Lower MSD signaling for TR 38.881", 3GPP TSG-RAN WG4 Meeting #106, R4-2303520, Agenda: 8.6.4, Nokia, Feb. 27-Mar. 3, 2023, 3 pages.
"TP for TR 38.881 update of MSD 0 dB region approach", 3GPP TSG-RAN WG4 Meeting # 107, R4-2307089, Agenda: 8.5.1.3, Nokia, May 22-26, 2023, 3 pages.

* cited by examiner

REPORTING REGIONS OF LOW OR ZERO MAXIMUM SENSITIVITY DEGRADATION

RELATED APPLICATIONS

This application claims priority to U.S. Provisional Patent Application No. 63/382,578, filed Nov. 7, 2022, entitled "REPORTING REGIONS OF LOW OR ZERO MAXIMUM SENSITIVITY DEGRADATION" the disclosure of which is hereby incorporated by reference herein in its entirety.

TECHNICAL FIELD

This description relates to telecommunications systems.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in an attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, by a user equipment to a network node of a wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, an apparatus includes at least one processor and at least one memory including computer program code, the at least one memory and the computer program code configured to, with the at least one processor, cause the apparatus at least to transmit, by a user equipment to a network node of a wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, an apparatus includes means for transmitting, by a user equipment to a network node of a wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, a computer program product includes a computer-readable storage medium and storing executable code that, when executed by at least one data processing apparatus, is configured to cause the at least one data processing apparatus to transmit, by a user equipment to a network node of a wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, a method includes receiving, by a network node of a wireless network from a user equipment in the wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, an apparatus includes at least one processor and at least one memory including computer program code, the at least one memory and the computer program code configured to, with the at least one processor, cause the apparatus at least to receive, by a network node of a wireless network from a user equipment in the wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, an apparatus includes means for receiving, by a network node of a wireless network from a user equipment in the wireless network, the network node controlling a cell associated with an aggressor frequency band combination including an aggressor frequency band and a victim frequency band, a message indicating at least one region of the victim frequency band that has smaller values of a maximum sensitivity degradation than values of the maximum sensitivity degradation in another region of the victim frequency band.

According to an example implementation, a computer program product includes a computer-readable storage medium and storing executable code that, when executed by at least one data processing apparatus, is configured to cause the at least one data processing apparatus to receive, by a network node of a wireless network from a user equipment in the wireless network, the network node controlling a cell associated with a frequency band combination including an aggressor frequency band and a victim frequency band, a message indicating at least one region of the victim frequency band that has smaller values of a maximum sensitivity degradation than values of the maximum sensitivity degradation in another region of the victim frequency band.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
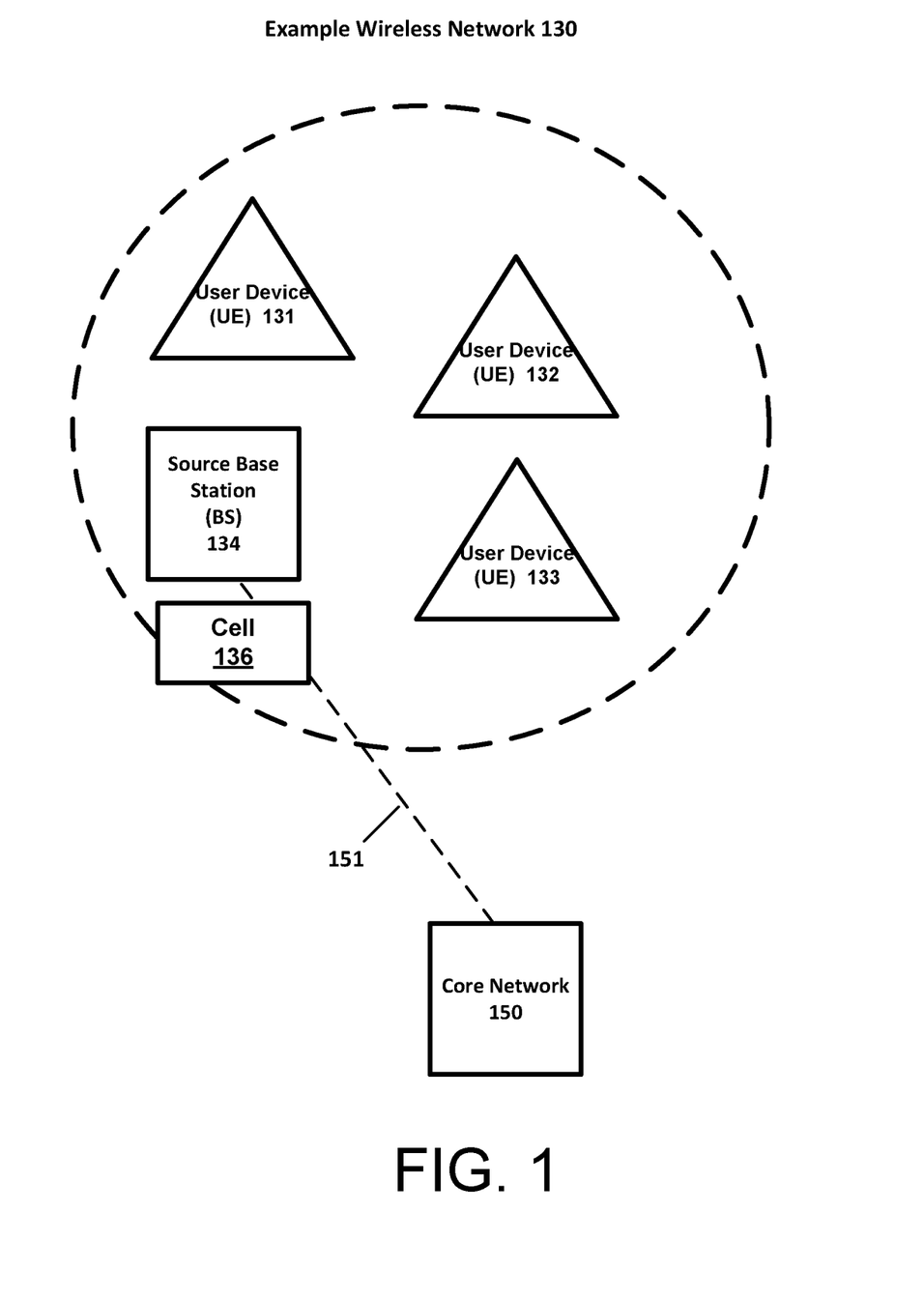
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices or BS may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Receiver sensitivity on a user equipment (UE) determines a minimum detectable signal. However, as the level of receiver noise floor increases, the sensitivity degrades. Such a degradation of sensitivity may cause a loss of cell coverage. Factors affecting the degradation of sensitivity can include radio frequency (RF) impairments from nonlinearities such as inter-modulation distortion (IMD) and generated harmonics falling into a victim frequency band. It is noted that the term "frequency band" used herein may refer to cell frequency band, UE's frequency band, UE's assigned bandwidth part, or channel bandwidth. Thus, the term "victim frequency band" may refer to a victim channel bandwidth.

Maximum sensitivity degradation (MSD) is a measure of how much degradation of receiver sensitivity compared to a specified receiver sensitivity can be seen. For example, if a specified reference sensitivity for a band is −100 dBm for 5 MHz channel bandwidth and if the sensitivity degrades up to −70 dBm, then, the MSD is 30 dB.

Some carrier aggregation (CA) band configurations have large reference sensitivity degradation, i.e., large values of MSD due to the factors such as IMD and generated harmonics. Nevertheless, the MSD value can vary between different UEs. In some cases, large values such as around 30 dB MSD may be specified for some MSD types for some band configurations. Since the MSD values are implementation-specific, the actual MSD value for a given band configuration may be different for different UEs so that for some UEs, the actual MSD may be smaller than the specific minimum requirement for MSD value for the band configuration. Note that RAN4 specifies "minimum" requirement so that the assumptions to derive MSD as specification are very conservative and based on worst-case estimates. Hence, MSD values are diverse from UE model to UE model.

MSD is an indicator of maximum sensitivity degradation for RF receiver reference sensitivity for CA and DC in 3GPP. In some cases, in the case where band configurations have some MSD, some relaxations for reference sensitivity by the amount of MSD are allowed as exception. Consider an example in which there is an UL harmonic from a PC3 aggressor NR UL (n1) band for NR DL CA FR1 (n77). When CA_n1-n77 is configured, 23.9 dB reference sensitivity degradation is allowed for 10 MHz channel bandwidth for n77 under a certain frequency condition. It should be noted that 10 MHz channel bandwidth (CBW) reference sensitivity for n77 single band operation is −95.3 dBm. When the reference sensitivity for n77 for CA_n1-n77 operation is tested, the UE can pass the requirement with the desired signal power level of −71.4 dBm (−95.3 dBm+23.9 dB).

The large MSD values may effectively render the band configuration useless for practical deployments. The reason is, even if a network configures a UE with the band configuration, the UE may or may not receive n77 DL signal correctly due to the large MSD. If the UE does not receive the signal correctly, it means time and frequency resources of the network are wasted so the entire band configuration may never be deployed.

It is noted that 3GPP requirements are minimum requirements so that there are UEs with low MSD or even zero MSD for a given band configuration that allows large MSD. However, even if there are UEs with quite small MSD values, the network may treat those UEs in the same manner as other UEs with larger MSD because there may be no way to differentiate the better-performing UEs and the worse-performing UEs. This decreases UE or chip set vendors' motivation to develop UEs with better performance than 3GPP requirements, as there is no benefit for the UE to do so because network cannot make maximum use of the UE with lower MSD if the network cannot differentiate UE with lower and larger MSDs.

Unless a reported MSD value is 0 dB, it requires more complicated implementation efforts to utilize non-zero MSD values than those for the MSD value of 0 dB. Nevertheless, it would be less likely for a UE to report an MSD value of 0 dB specifically for a specified MSD whose value is large such as 20 dB or greater. The current MSD definition, however, considers the total noise falling into a victim channel bandwidth, while it is known that in practice the noise is not flat within the channel bandwidth. Accordingly, this means there are one or more regions where the MSD is smaller than the maximum-allowed MSD (including even zero MSD regions), and this useful information of zero-MSD may not be utilized at all at the gNB.

Figure 2:
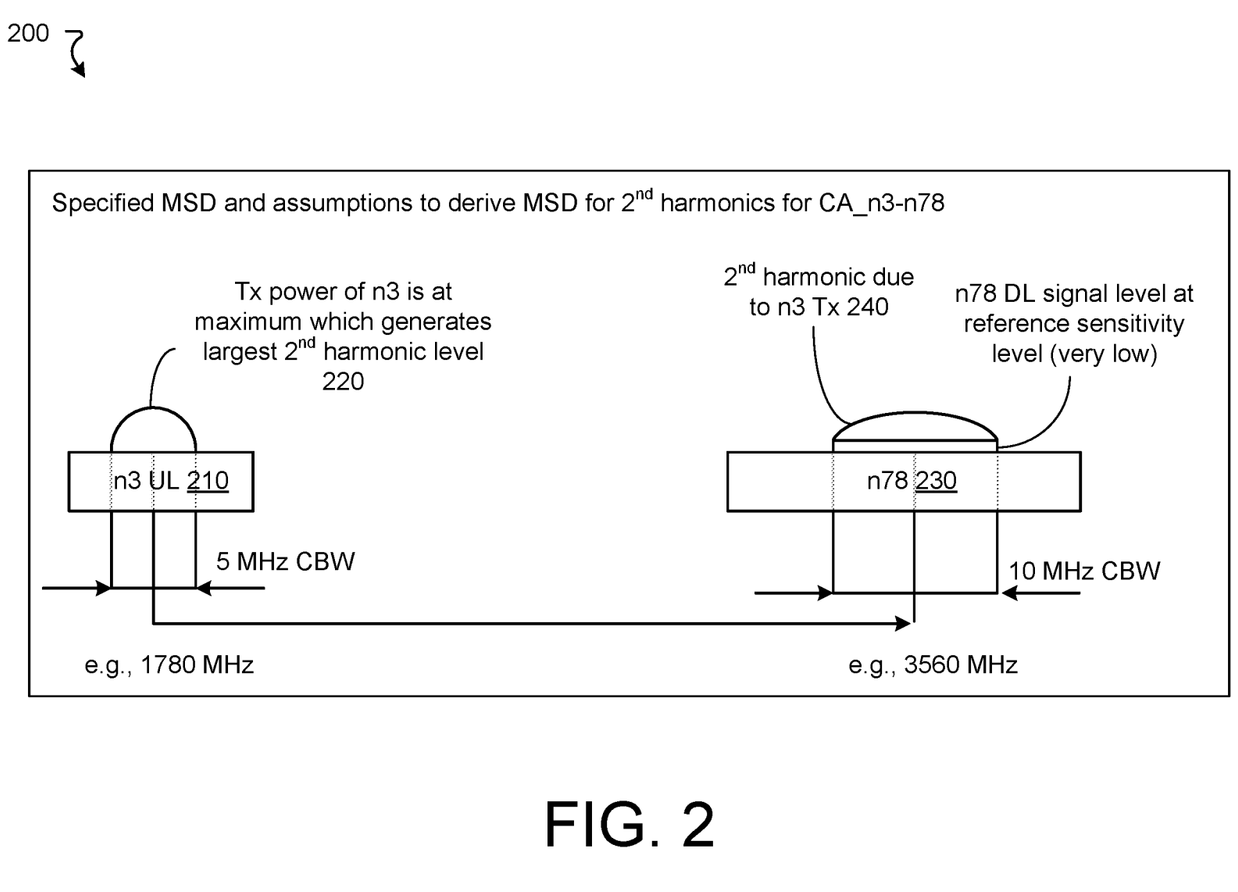
FIG. 2 is a diagram illustrating assumptions to derive maximum sensitivity degradation (MSD) for second transmitter harmonic, for carrier aggregation CA_n3-n78, according to an example implementation.

First, specified MSD for per-MSD type per band combination is defined under the worst test condition: that Tx power for an aggressor band is the highest and wanted signal level for a victim band is the smallest, i.e., reference sensitivity level as shown in FIG. 2. As shown in the scenario 200 illustrated in FIG. 2, since most of the $2^{nd}$ transmitter harmonic power 240 is contained within the bandwidth of twice of the aggressor bandwidth 210, i.e., 2×5 MHz=10 MHz, the victim bandwidth 230 is defined as 10 MHz. Other MSDs for other MSD types (e.g., IMD and harmonic mixing) are defined in a similar way. Note that cross band isolation is normally defined in a way that victim bandwidth is the smallest and aggressor bandwidth is the highest among channel bandwidths defined as mandatory support for the respective bands (victim and aggressor). In any case, the purpose is enabling the test condition to become worst as much as possible. Accordingly, this is a snapshot of the UE's performance and the specified MSD value does not always happen.

Second, the concept of lower MSD capability signalling was proposed to allow UE with better performance to be treated in a more appropriate manner by NW. e.g., if there is a network which uses RSRP as CA configuration admission control, the network may use the capability as an offset. More specifically, if RSRP of −60 dBm for a CA with a specified MSD of 30 dB is the threshold of CA configuration and if a UE indicates MSD of 10 dB, the threshold becomes −80 (−60−(30−10)) dBm. There are questions as to whether lower MSD capability can be utilized by the network, as even if the UE indicates the capability, that capability still just a snapshot of the UE's capability. Moreover, the specified MSD does not always occur as the Tx power for the aggressor band is not always at maximum and/or a desired signal level at the victim band is not always the same that of specified reference sensitivity level for the victim band. Theoretically, however, consideration of a UE's Tx power for aggressor band(s) as well as wanted signal level at a victim band(s) may bring more optimized resource scheduling while it brings even more complicated implementation and specifications. For example, if the Tx power of band n3 is considered, for band n78 the gNB needs to take into account n3 Tx power while normally, Tx power is controlled per cell basis in the specification and implementation. This implies that a gNB for n78 (a victim band), would not take into account for Tx power of n3 (aggressor band) in such an implementation.

A threshold and how to indicate lower MSD capability may also be considered. For example, if two bits are allowed to indicate lower MSD capability, 0, 6, 12 and 18 dB can be signalled or 0, 5, 10 and 15 dB etc., can be signalled. Nevertheless, this option may not be agreeable since, if the upper bound is smaller, e.g., 15 dB, even if a UE improves MSD by 20 dB for a band combination whose specified MSD is 36 dB, the UE cannot indicate lower MSD capability. While if the upper bound is large as 18 dB, the aforementioned UE may be allowed to indicate lower MSD capability, but the number of band combinations (BCs) whose specified MSD is more than 36 dB is very limited and the granularity of MSD capability becomes coarser.

MSD of 0 dB may be useful to be indicated since if MSD per MSD type per BC is 0 dB for a BC, the BC is treated in the same manner that BCs with specified MSD of 0 dB are treated, while it is also expected that achieving MSD of 0 dB for an entire victim channel bandwidth for a BC is quite challenging based on feasibility study. In addition, MSD definition considers all the noise within the victim channel bandwidth in RAN4. Real noise within the victim channel bandwidth, however, is not flat over the channel bandwidth and it is likely that the noise is larger at the centre of MSD originating source as can be seen in FIG. 2. It is noted that for cross band isolation, the noise in a victim channel bandwidth may be asymmetric. Hence, in this case, the UE can have better isolation between aggressor noise source and victim channel bandwidth, even though MSD-based conventional definition, i.e., consideration of the total noise across victim channel bandwidth, cannot be zero, there can be a frequency region(s) where MSD is zero dB.

In contrast to the above-described conventional wireless communications which cannot differentiate between UEs with different MSDs, improved techniques of wireless communications include enabling the UE to indicate to the network regions in the channel bandwidth of the cell in the victim band or in the victim band of a band combination where the MSD is zero or small. The indication defines a frequency boundary where MSD is "low" (e.g., small or zero dB or otherwise less than a threshold) and MSD is "high" (e.g., >0 dB or otherwise greater than the threshold), and may contain a frequency offset from the centre of the MSD originating source to the boundary. The UE indication may be given as part of UE capabilities (e.g., UE indicates the MSD region and MSD value within the region per MSD type per BC), or as a part of UE response to a network request (e.g., network requests UE to report MSD values for a given MSD type per band combination and UE provides the information), with a UE capability for supporting such request-response mechanism. If the BC is part of a CA or DC configuration, the UE may communicate the MSD regions with at least one network node, e.g., each of the network nodes controlling the cells associated with the CA or DC.

The improved signaling allows a network to utilize frequency resources in a more efficient way than in the conventional approach assuming non-zero MSD capability for the entire victim bandwidth.

UE indication to the network is considered on a band combination basis, wherein the indication contains one or more frequency regions where MSD is "small". This allows the network to utilize frequency resources in a more efficient way than simply assuming in the conventional approaches non-zero MSD capability for the entire victim bandwidth. The indication also defines a frequency boundary where MSD is "low" (e.g., small or zero dB) and MSD is "high" (e.g., >0 dB), and may contain a frequency offset from the centre of the MSD originating source to the boundary.

Figure 3:
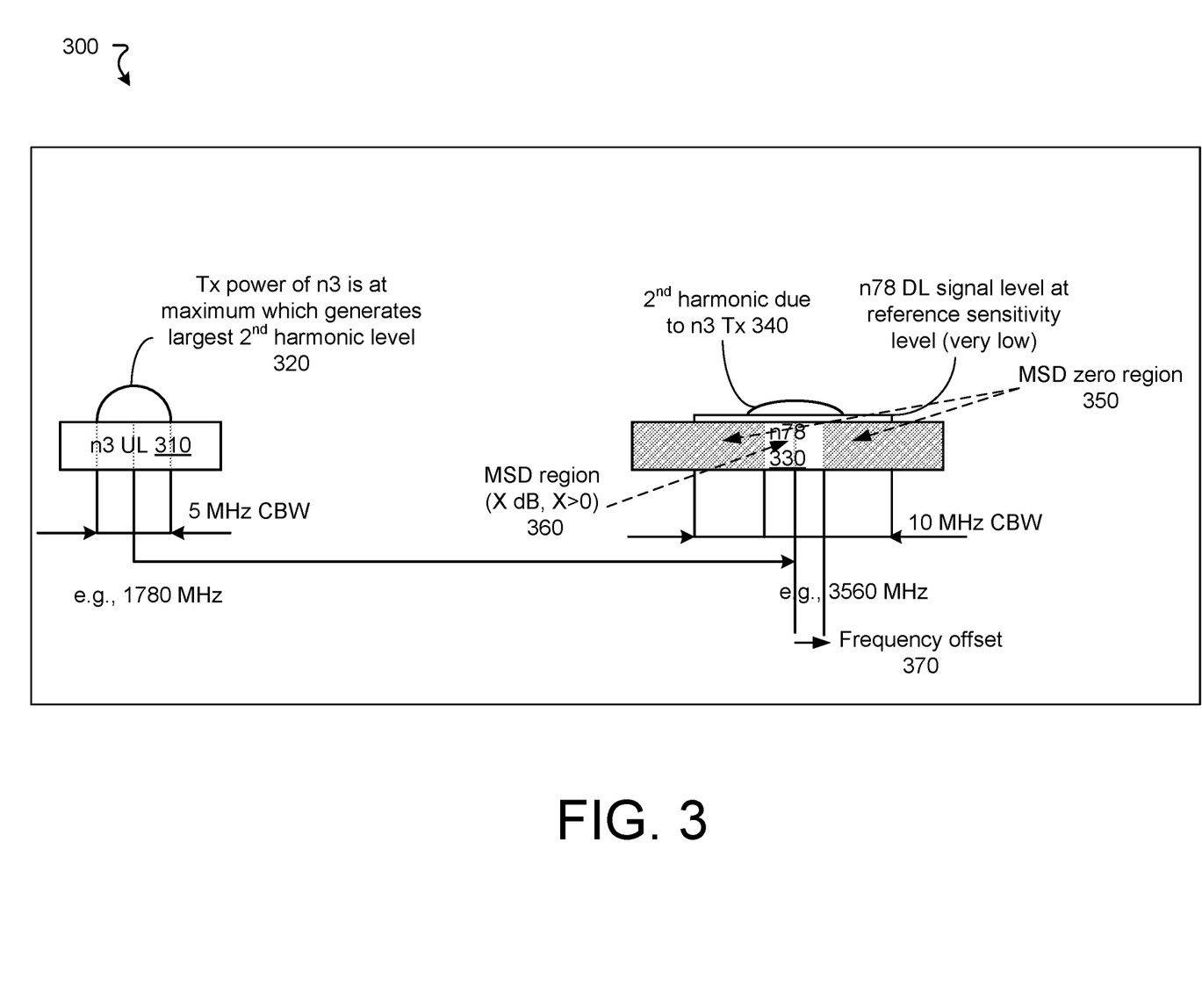
FIG. 3 is a diagram illustrating assumptions to derive maximum sensitivity degradation (MSD) for second transmitter harmonic, for carrier aggregation CA_n3-n78, with regions of zero MSD, according to an example implementation.

FIG. 3 is a diagram illustrating a scenario 300 showing assumptions to derive maximum sensitivity degradation (MSD) for a second transmitter harmonic 320, for carrier aggregation CA_n3-n78, with a region 350 of zero MSD. As shown in the scenario 300 illustrated in FIG. 3, since most of the $2^{nd}$ harmonic power 340 is contained within the bandwidth of twice of the aggressor bandwidth 310, i.e., 2×5 MHz=10 MHz, the victim bandwidth 330 is defined as 10 MHz. FIG. 3 illustrates the case where the UE indicates where the combination band the MSD is 0 dB. In FIG. 3, a frequency boundary is defined to indicate where the MSD zero region 350 begins or the region 360 where MSD is non-zero ends. This allows the UE to indicate an offset frequency 370 from the center of the MSD originating source to the boundary.

Because the MSD is 0 dB in the MSD zero region, the network does not need to consider Tx power. Rather, the network is enabled to schedule UL (aggressor band(s)) and/or DL (victim band(s)) frequency resources in the same manner as single carrier so long as DL frequency resources are allocated to the MSD zero region. This makes scheduling implementation even simpler than the conventional utilizing originally considered lower MSD capability, i.e., MSD value over victim channel bandwidth.

Figure 4:
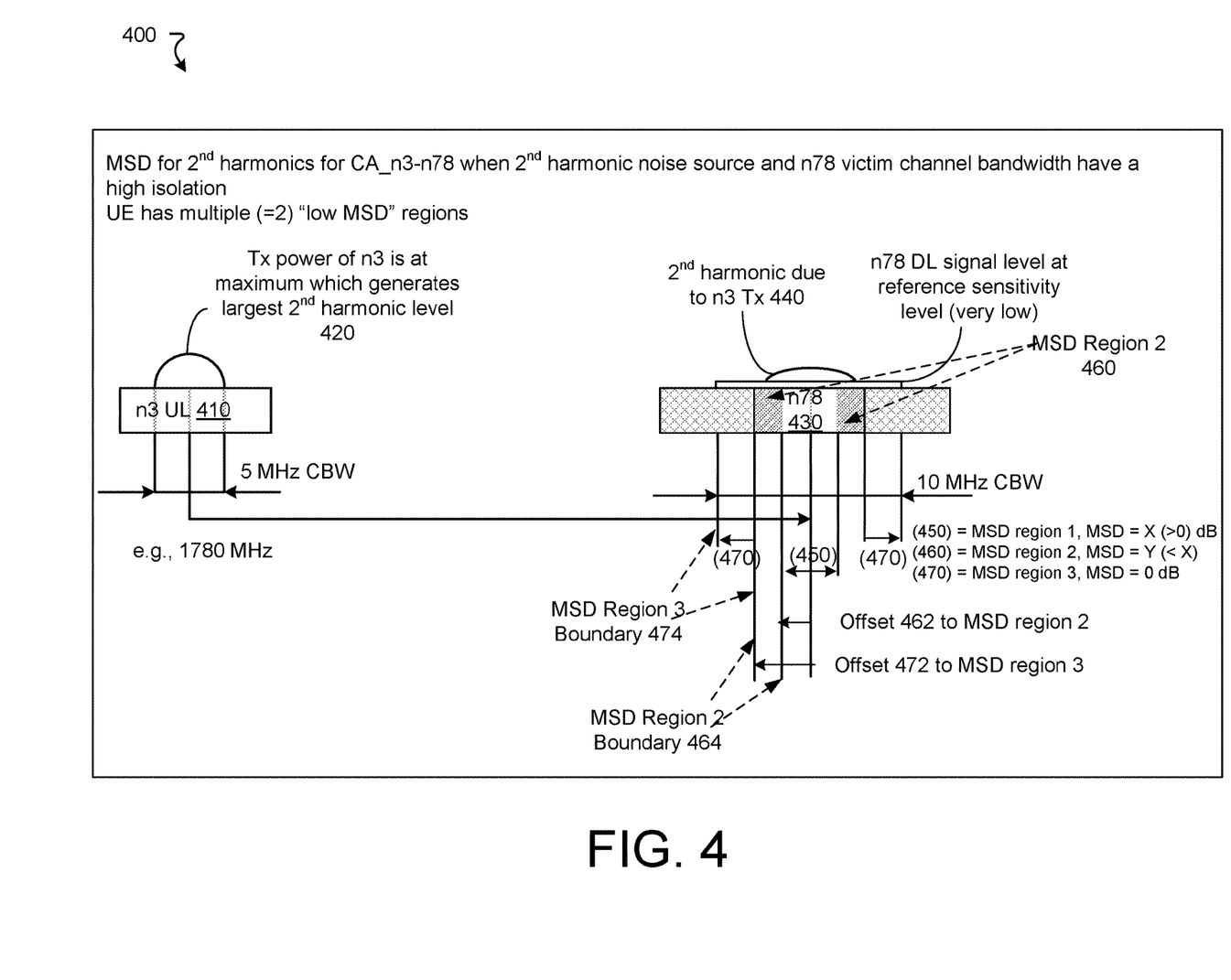
FIG. 4 is a diagram illustrating assumptions to derive maximum sensitivity degradation (MSD) for second transmitter harmonic, for carrier aggregation CA_n3-n78, with regions of zero and small, nonzero MSD, according to an example implementation.

FIG. 4 is a diagram illustrating a scenario 400 showing assumptions to derive maximum sensitivity degradation (MSD) for second harmonic 420, for carrier aggregation CA_n3-n78, with regions 450 of large MSD, 460 of small MSD, and 470 of zero MSD. Region 460 is shown with offset 462 and boundaries 464, and region 470 is shown with offset 472 and boundaries 474. As shown in the scenario 400 illustrated in FIG. 4, since most of the $2^{nd}$ harmonic power 440 is contained within the bandwidth of twice of the aggressor bandwidth 410, i.e., 2×5 MHz=10 MHz, the victim bandwidth 430 is defined as 10 MHz. In the scenario 400, the region 460, the MSD may be 3 dB while MSD_max=30 dB in region 450. In this way, the region boundaries approximate a more complex noise profile within the channel bandwidth.

The UE communicates the regions and their characteristics (zero or low-MSD) to the network in a message. A possible format for the message may be expressed in terms of UE capability. In this scheme, the UE indicates in capabilities the (at least one) MSD region it supports. Since this may depend on an MSD type and band combination, it may be per-band, per MSD type, per-band combination (BC) capability. The communication below consists of signalling for a single MSD type for a band combination, and may be repeated for each MSD type.

For only zero-MSD regions, the message has the following format.

```
BandParameters-v18xy ::=    SEQUENCE {
  -- Indicates low MSD support per-band in this BC:
  low-MSD-r18      SEQUENCE(SIZE(1..maxSimultaneousBands)) OF
  Low-MSD-r18    OPTIONAL
    -- Indicates MSD type in this signalling::
  low-MSD-Type-r18    ENUMERATED {imd2, imd3, imd4, imd5,
  crossBand, harmonics, harmonicMixing, spare1} OPTIONAL
  }
Low-MSD-r18 ::= SEQUENCE {
  -- Intefererence source as the index of the band entry in
  this BC:
  msd-Source-r18      INTEGER (1..maxSimultaneousBands)),
    -- MSD regions for the interfering UL band:
  msd-Region-r18    MSD-Region-r18
  }
MSD-Region-r18 ::= SEQUENCE {
  -- Frequency offset in terms of sub-carriers for the lower
  limit from center frequency:
    msd-RegionOffsetLow-r18           INTEGER (0..4095),
    -- Frequency offset in terms of sub-carriers for the upper
```

-continued

```
limit from center frequency:
    msd-RegionOffsetHigh-r18        INTEGER (0..4095)
}
```

For multiple "low" MSD regions (with zero MSD as a possibility), the message has the following format.

```
BandParameters-v18xy ::=    SEQUENCE {
  -- Indicates low MSD support per-band in this BC:
  low-MSD-r18  SEQUENCE(SIZE (1..maxSimultaneousBands) OF
Low-MSD-r18  OPTIONAL
  -- Indicates MSD type in this signalling::
low-MSD-Type-r18    ENUMERATED {imd2, imd3, imd4, imd5,
crossBand, harmonics, harmonicMixing, spare1} OPTIONAL
}
Low-MSD-r18 ::= SEQUENCE {
  -- Interfererence source as the index of the band entry in
this BC:
    msd-Source-r18    INTEGER (1..maxSimultaneousBands)),
  -- MSD regions for the interfering UL band:
    msd-RegionList-r18  MSD-RegionList-r18
}
MSD-RegionList-r18 ::= SEQUENCE (SIZE (1..maxMSD-Regions-r18)
OF MSD-Region
MSD-Region-r18 ::= SEQUENCE
  -- MSD value in steps of 0.5 dB from 0 to 31.5 dB:
    msd-Value-r18            INTEGER (0..64),
  -- Frequency offset in terms of sub-carriers for the lower
limit from center frequency:
    msd-RegionOffsetLow-r18        INTEGER (0..4095),
  -- Frequency offset in terms of sub-carriers for the upper
limit from center frequency:
    msd-RegionOffsetHigh-r18       INTEGER (0..4095)
}
```

In some implementations, the message takes the form of a request-response scheme initiated by the network. In this scheme, UE only indicates a capability that it supports the request-response scheme, and the network uses that to determine that it can request the UE to provide the MSD region for either currently configured BC, or for a given band combination with a given MSD source. UE then reports the information to the network. The message has the following format.

```
RRCReconfiguration-v18xy ::=                SEQUENCE {
    -- Request low MSD support from UE:
    reportLow-MSD-r18         ENUMERATED {true} OPTIONAL
}
RRCReconfigurationComplete ::= SEQUENCE {
  low-MSD-r18              Low-MSD-r18          OPTIONAL
}
Low-MSD-r18 ::= SEQUENCE {
  -- Interfererence source as the index of the band entry in
this BC:
    msd-Source-r18        INTEGER (1..maxSimultaneousBands)),
  -- MSD regions for the interfering UL band:
    msd-RegionList-r18    MSD-RegionList-r18
  -- Indicates MSD type in this signalling::
low-MSD-Type-r18            ENUMERATED {imd2, imd3, imd4, imd5,
crossBand, harmonics, harmonicMixing, spare1} OPTIONAL
}
MSD-RegionList-r18 ::= SEQUENCE (SIZE (1..maxMSD-Regions-r18)
OF MSD-Region
MSD-Region-r18 ::= SEQUENCE
  -- MSD value in steps of 0.5 dB from 0 to 31.5 dB:
    msd-Value-r18                    INTEGER (0..64),
  -- Frequency offset in terms of sub-carriers for the lower
limit from center frequency:
    msd-RegionOffsetLow-r18                  INTEGER (0..4095),
  -- Frequency offset in terms of sub-carriers for the upper
limit from center frequency:
    msd-RegionOffsetHigh-r18                 INTEGER (0..4095)
}
```

Figure 5:
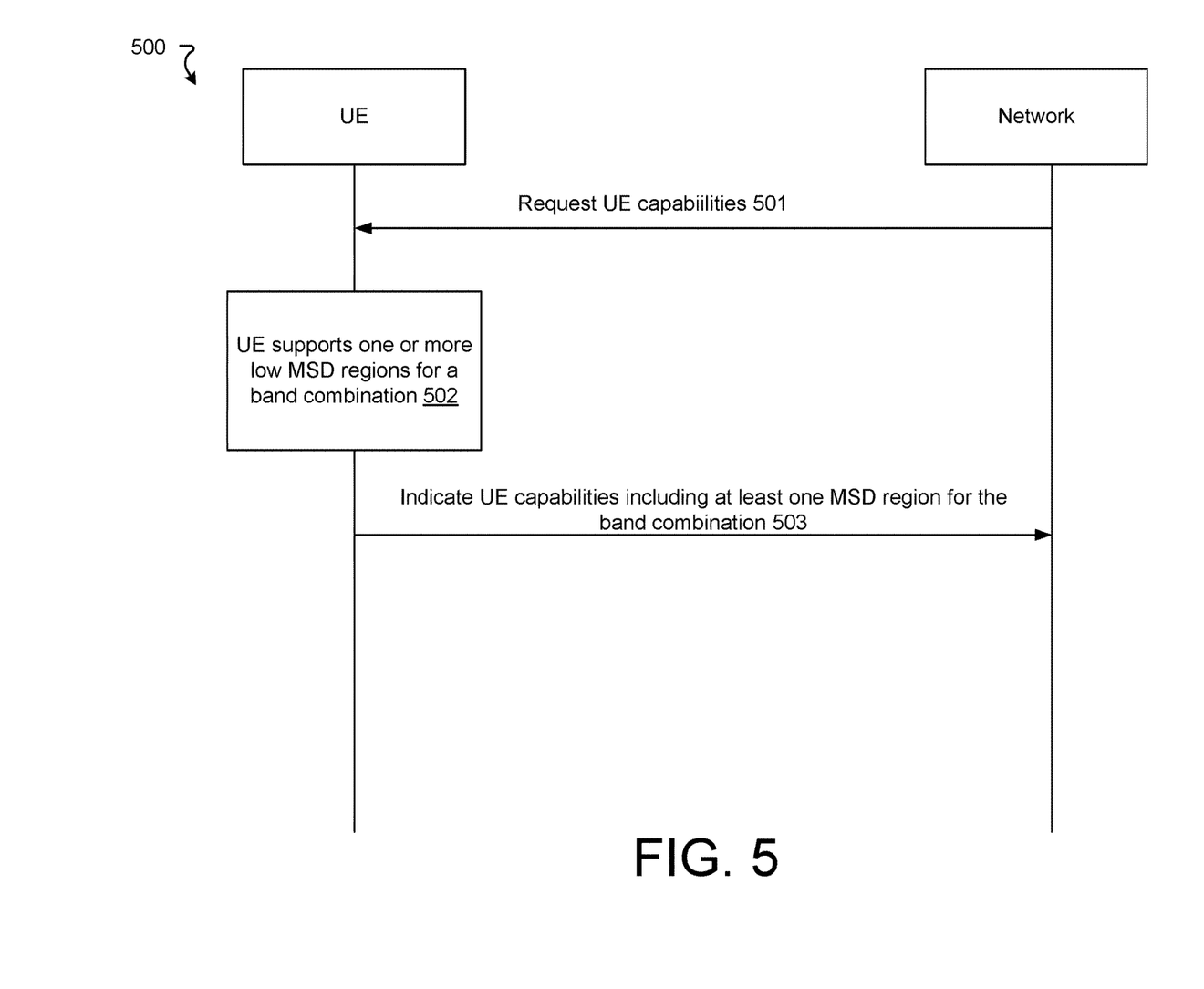
FIG. 5 is a signalling diagram illustrating a communication of a message indicating a region of zero MSD with a network, according to an example implementation.

FIG. 5 is a signaling diagram illustrating a communication 500 of a message indicating a region of low (small or zero) MSD with a network.

At 501, a network (node) sends a request for UE capabilities to a UE.

At 502, the UE determines that it supports at least one low MSD region for a band combination.

At 503, the UE sends a message to the network (node) indicating UE capabilities including at least one low MSD region for the band combination.

Figure 6:
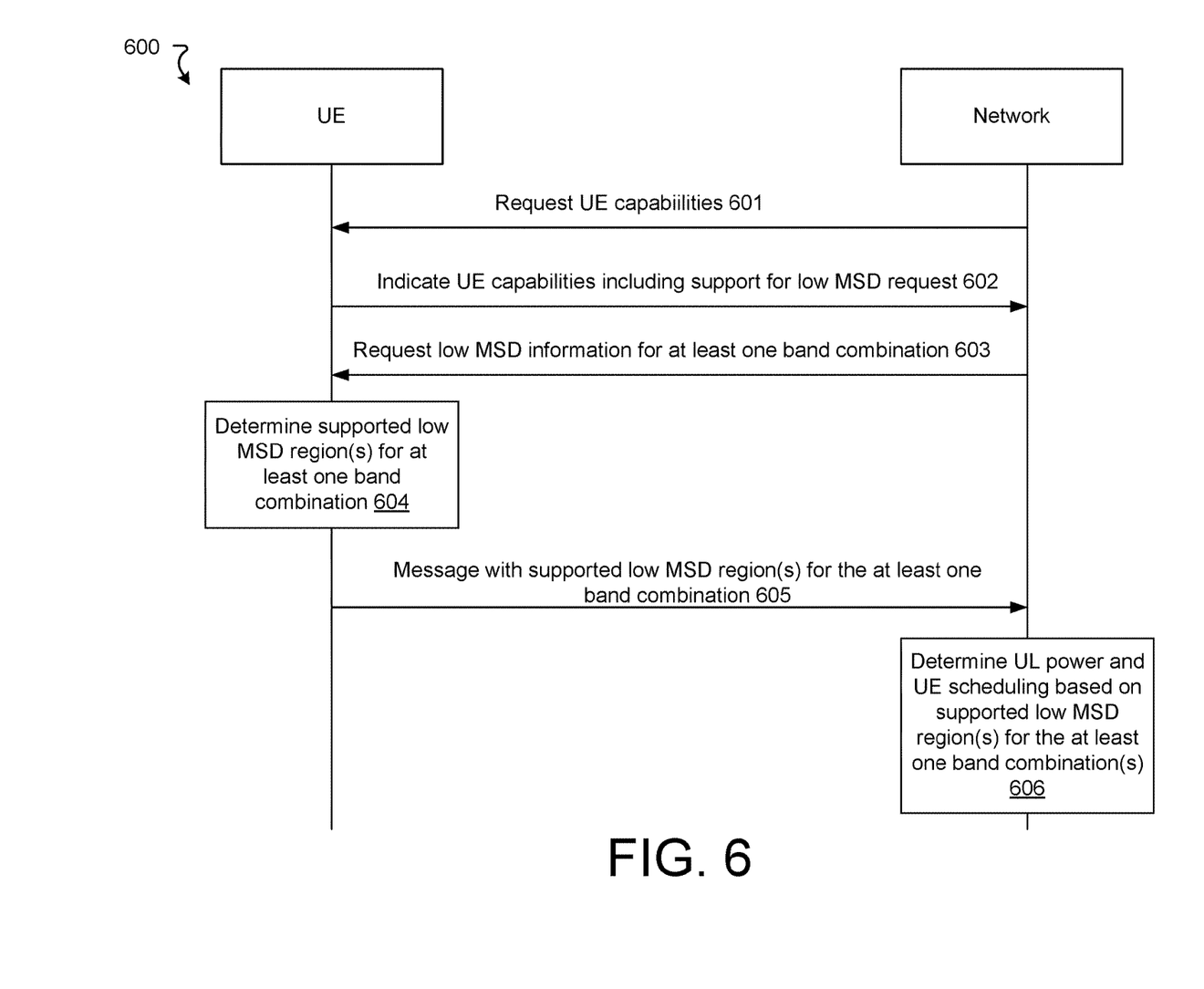
FIG. 6 is a signalling diagram illustrating a communication of a message indicating a region of zero MSD with a network, according to an example implementation.

FIG. 6 is a signaling diagram illustrating a communication of a message indicating a region of low (small or zero) MSD with a network.

At 601, a network (node) sends a request for UE capabilities to a UE.

At 602, the UE sends a response indicating its capabilities, which include support for a low MSD request.

At 603, the network sends a request to the UE for low MSD information for at least one band combination.

At 604, the UE determines supported low MSD regions for at least one band combination.

At 605, the UE sends the network a message indicating supported low MSD regions for the at least one band combination.

At 606, the network determines UL power and UE scheduling (e.g., time and frequency resources) based on the supported low MSD regions for the at least one band combination.

Figure 7:
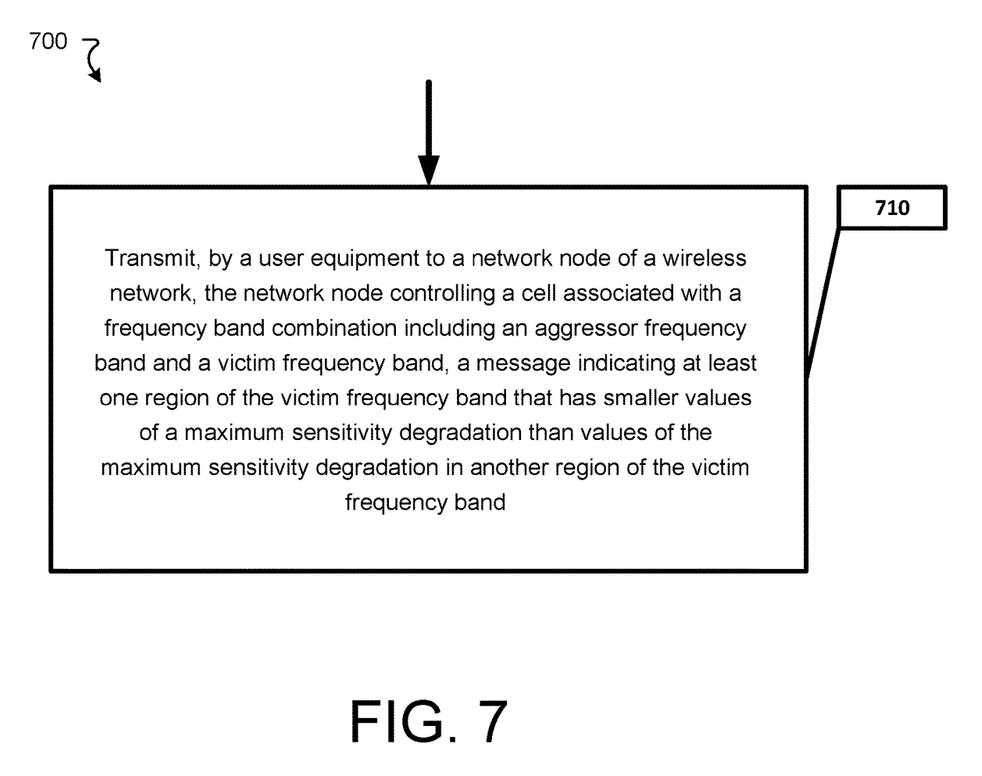
FIG. 7 is a flow chart illustrating a process of indicating a region of zero MSD with a network, according to an example implementation

Example 1-1: FIG. 7 is a flow chart illustrating a process 700 of communicating regions of low (small or zero) MSD. Operation 710 includes transmitting, by a user equipment to a network node of a wireless network, the network node controlling a cell associated with a frequency band combination including an aggressor frequency band and a victim frequency band, a message indicating at least one region of the victim frequency band that has a smaller value of a maximum sensitivity degradation than value of the maximum sensitivity degradation in another region of the victim frequency band.

Example 1-2: According to an example implementation of Example 1-1, further comprising receiving, from the network node, a request for capabilities of the user equipment; wherein the message includes information about a region of low MSD value for the frequency band combination and is sent in response to the request.

Example 1-3: According to an example implementation of Examples 1-1 to 1-2, further comprising receiving, from the network node, a first request for capabilities of the user equipment; transmitting, to the network node, an indication that the user equipment is able to support a request for low MSD information; and receiving, from the network node, a second request for information about region of small MSD value for the frequency band combination; wherein the message is sent in response to the second request.

Example 1-4: According to an example implementation of Examples 1-1 to 1-3, wherein the at least one region of the victim frequency band that has a smaller value of a maximum sensitivity degradation has value of the maximum sensitivity degradation that is equal to zero.

Example 1-5: According to an example implementation of Examples 1-1 to 1-4, wherein the at least one region of the victim channel bandwidth or the victim frequency band that has a smaller value of a maximum sensitivity degradation than the value of the maximum sensitivity degradation in another region of the victim channel bandwidth or the victim frequency band.

Example 1-6: According to an example implementation of Examples 1-1 to 1-5, wherein the message further indicates an offset frequency from a center of an originating source of the MSD.

Example 1-7: An apparatus comprising means for performing a method of any of Examples 1-1 to 1-6.

Example 1-8: A computer program product including a non-transitory computer-readable storage medium and storing executable code that, when executed by at least one data processing apparatus, is configured to cause the at least one data processing apparatus to perform a method of any of Examples 1-1 to 1-6.

Figure 8:
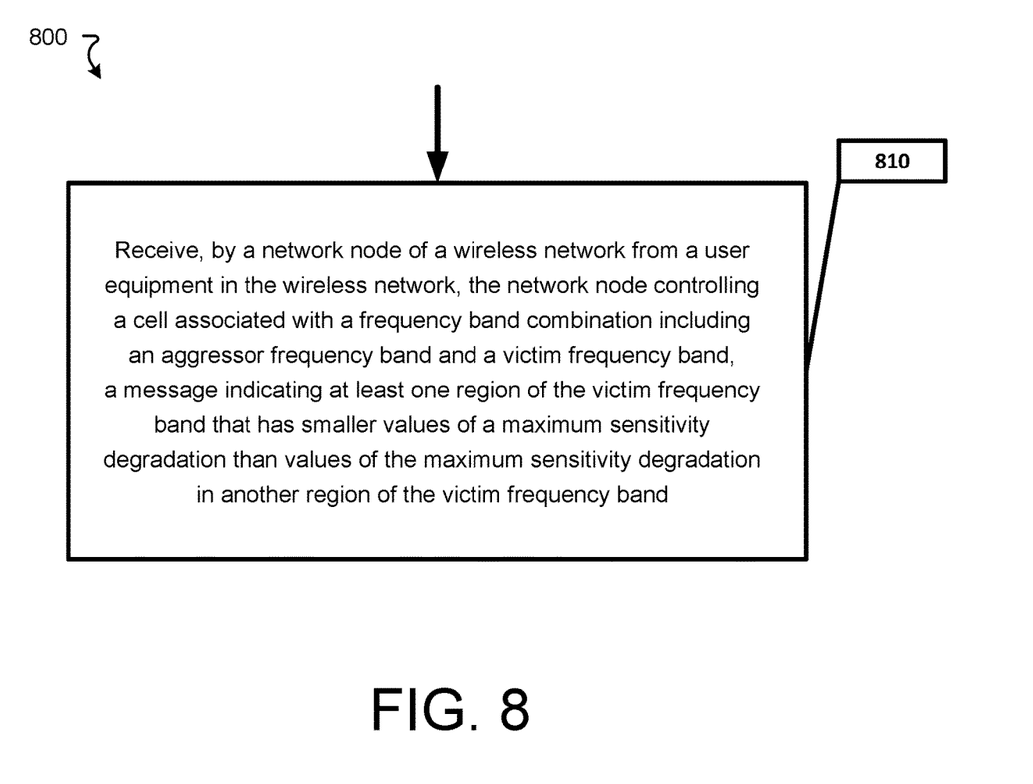
FIG. 8 is a flow chart illustrating a process of indicating a region of zero MSD with a network, according to an example implementation.

Example 2-1: FIG. 8 is a flow chart illustrating a process 800 of communicating regions of small-MSD. Operation 810 includes receiving, by a network node of a wireless network from a user equipment in the wireless network, the network node controlling a cell associated with a frequency band combination including an aggressor frequency band and a victim frequency band, a message indicating at least one region of the victim frequency band that has a smaller value of a maximum sensitivity degradation than value of the maximum sensitivity degradation in another region of the victim frequency band.

Example 2-2: According to an example implementation of Example 2-1, further comprising receiving, from the user equipment, an indication that the user equipment is able to support a request for low MSD information; and transmitting, to the user equipment, a request for information about region of low MSD value for the frequency band combination; wherein the message is received from the user equipment in response to the request.

Example 2-3: According to an example implementation of Examples 2-1 to 2-2, further comprising determining uplink power and user equipment scheduling of time and frequency resources based on the at least one region of the victim frequency band that has a smaller value of a maximum sensitivity degradation.

Example 2-4: An apparatus comprising means for performing a method of any of Examples 2-1 to 2-3.

Example 2-5: A computer program product including a non-transitory computer-readable storage medium and storing executable code that, when executed by at least one data processing apparatus, is configured to cause the at least one data processing apparatus to perform a method of any of Examples 2-1 to 2-3.

Example 3-1: A process of communicating regions of small-MSD includes transmitting, by a user equipment to a network node of a wireless network, a message indicating at least one region of a victim frequency band that has a smaller maximum sensitivity degradation (MSD) value than a MSD value in another region of the victim frequency band, wherein the network node controls a cell associated with a frequency band combination including an aggressor frequency band and the victim frequency band.

Example 3-2: According to an example implementation of Example 3-1, further comprising receiving, from the network node, a request for capabilities of the user equipment; and wherein the message includes information about a region of the victim frequency band having a low MSD value and is sent in response to the request.

Example 3-3: According to an example implementation of Examples 3-1 or 3-2, further comprising receiving, from the network node, a first request for capabilities of the user equipment; transmitting, to the network node, an indication that the user equipment is able to support a request for information about a region of the victim frequency band having a low MSD value; and receiving, from the network node, a second request for information about the region of the victim frequency band having the low MSD value; wherein the message is sent in response to the second request.

Example 3-4: According to an example implementation of Examples 3-1 to 3-3, wherein the at least one region of the victim frequency band that has the smaller MSD value has a MSD value that is equal to zero.

Example 3-5: According to an example implementation of Examples 3-1 to 3-4, wherein the at least one region of the victim frequency band that has the smaller MSD value has a MSD value that is less than a threshold.

Example 3-6: According to an example implementation of Examples 3-1 to 3-5, wherein the message further indicates an offset frequency from a center of an originating source of the MSD value.

Example 3-7: An apparatus comprising means for performing a method of any of Examples 3-1 to 3-6.

Example 3-8: A computer program product including a non-transitory computer-readable storage medium and storing executable code that, when executed by at least one data processing apparatus, is configured to cause the at least one data processing apparatus to perform a method of any of Examples 3-1 to 3-6.

Example 4-1: A process of communicating regions of small-MSD includes receiving, by a network node of a wireless network from a user equipment in the wireless network, a message indicating at least one region of a victim frequency band that has a smaller MSD value than a MSD value in another region of the victim frequency band, wherein the network node controls a cell associated with a frequency band combination including an aggressor frequency band and the victim frequency band.

Example 4-2: According to an example implementation of Example 4-1, further comprising receiving, from the user equipment, an indication that the user equipment is able to support a request for information about a region of the victim frequency band having a low MSD value; and transmitting, to the user equipment, the request for the information about the region of the victim frequency band having the low MSD value; wherein the message is received from the user equipment in response to the request.

Example 4-3: According to an example implementation of Examples 4-1 or 4-2, further comprising determining uplink power and user equipment scheduling of time and frequency resources based on the at least one region of the victim frequency band that has the smaller MSD value.

Example 4-4: An apparatus comprising means for performing a method of any of Examples 4-1 to 4-3.

Example 4-5: A computer program product including a non-transitory computer-readable storage medium and storing executable code that, when executed by at least one data processing apparatus, is configured to cause the at least one data processing apparatus to perform a method of any of Examples 4-1 to 4-3.

List of Example Abbreviations

Figure 9:
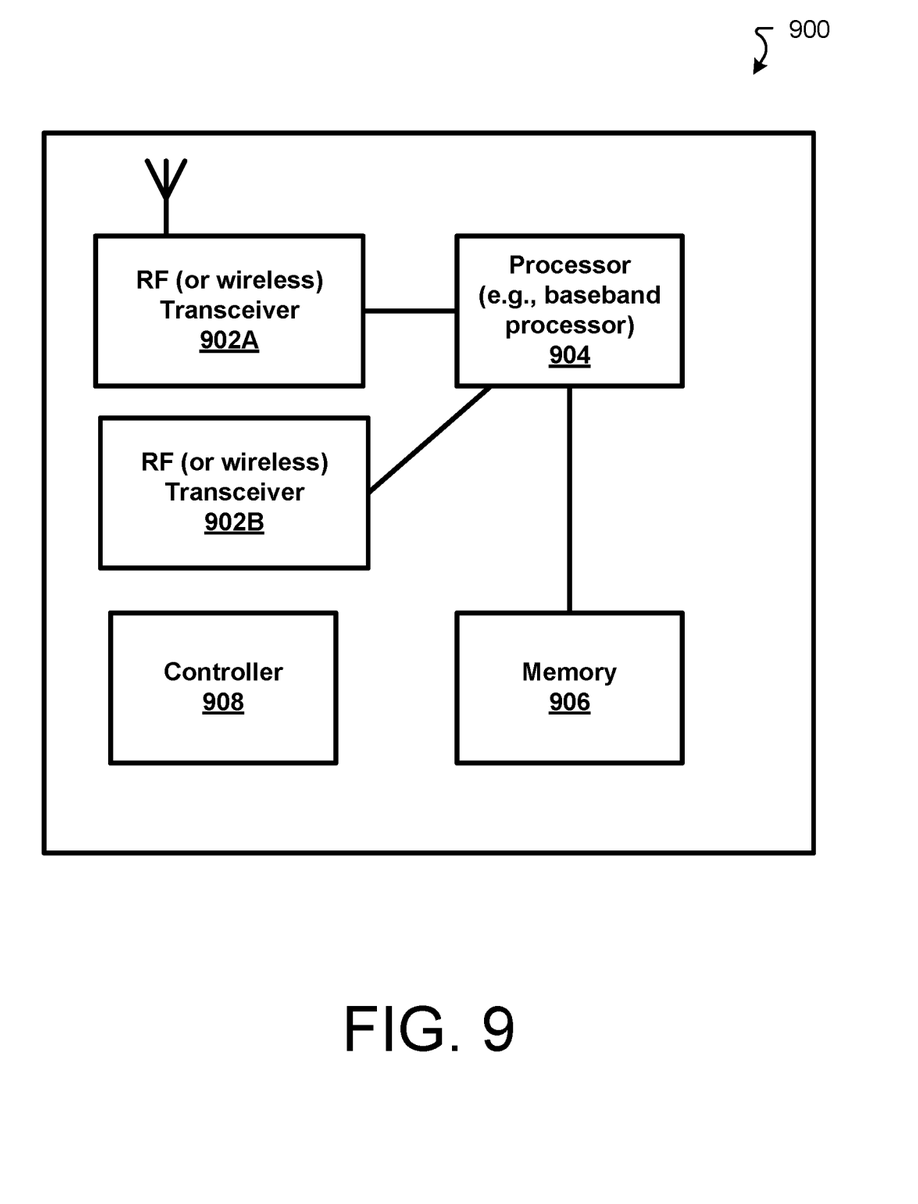
FIG. 9 is a block diagram of a node or wireless station (e.g., base station/access point, relay node, or mobile station/user device) according to an example implementation.

BC: Band Combination
CA: Carrier Aggregation
CBW: Channel Bandwidth
DC: Dual Connectivity
IMD: Inter Modulation Distortion
MSD: Maximum Sensitivity Degradation
RSRP: Reference Signal Received Power
UE: User Equipment FIG. 9 is a block diagram of a wireless station (e.g., AP, BS, e/gNB, NB-IoT UE, UE or user device) 900 according to an example implementation. The wireless station 900 may include, for example, one or multiple (two as in this example) RF (radio frequency) or wireless transceivers 902A, 902B, where each wireless transceiver includes a transmitter to transmit signals (or data) and a receiver to receive signals (or data). The wireless station also includes a processor or control unit/entity (controller) 904 to execute instructions or software and control transmission and receptions of signals, and a memory 906 to store data and/or instructions.

Processor 904 may also make decisions or determinations, generate slots, subframes, packets or messages for transmission, decode received slots, subframes, packets or messages for further processing, and other tasks or functions described herein. Processor 604, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 (902A or 902B) together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9 such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. An apparatus, comprising:
   at least one processor; and
   at least one memory including computer program code;
   the at least one memory and the computer program code configured to cause the apparatus at least to:
      transmit, by a user equipment to a network node of a wireless network, a message indicating at least one region of a victim frequency band that has a smaller maximum sensitivity degradation (MSD) value than a MSD value in another region of the victim frequency band, wherein the network node controls a cell associated with a frequency band combination including an aggressor frequency band and the victim frequency band.

2. The apparatus according to claim 1, wherein the at least one memory and the computer program code are further configured to cause the apparatus at least to:
   receive, from the network node, a request for capabilities of the user equipment;
   wherein the message includes information about a region of the victim frequency band having a low MSD value and is sent in response to the request.

3. The apparatus according to claim 1, wherein the at least one memory and the computer program code are further configured to cause the apparatus at least to:
   receive, from the network node, a first request for capabilities of the user equipment;
   transmit, to the network node, an indication that the user equipment is able to support a request for information about a region of the victim frequency band having a low MSD value; and receive, from the network node, a second request for information about the region of the victim frequency band having the low MSD value;
wherein the message is sent in response to the second request.

4. The apparatus according to claim 1, wherein the at least one region of the victim frequency band that has the smaller MSD value has a MSD value that is equal to zero.

5. The apparatus according to claim 1, wherein the at least one region of the victim frequency band that has the smaller MSD value has a MSD value that is less than a threshold.

6. The apparatus according to claim 1, wherein the message further indicates an offset frequency from a center of an originating source of the MSD value.

7. A method, comprising:
transmitting, by a user equipment to a network node of a wireless network, a message indicating at least one region of a victim frequency band that has a smaller maximum sensitivity degradation (MSD) value than a MSD value in another region of the victim frequency band, wherein the network node controls a cell associated with a frequency band combination including an aggressor frequency band and the victim frequency band.

8. The method according to claim 7, further comprising:
receiving, from the network node, a request for capabilities of the user equipment;
wherein the message includes information about a region of the victim frequency band having a low MSD value and is sent in response to the request.

9. The method according to claim 7, further comprising:
receiving, from the network node, a first request for capabilities of the user equipment;
transmitting, to the network node, an indication that the user equipment is able to support a request for information about a region of the victim frequency band having a low MSD value; and
receiving, from the network node, a second request for information about the region of the victim frequency band having the low MSD value;
wherein the message is sent in response to the second request.

10. The method according to claim 7, wherein the at least one region of the victim frequency band that has the smaller MSD value has a MSD value that is equal to zero.

11. The method according to claim 7, wherein the at least one region of the victim frequency band that has the smaller MSD value has a MSD value that is less than a threshold.

12. The method according to claim 7, wherein the message further indicates an offset frequency from a center of an originating source of the MSD value.

13. An apparatus, comprising:
at least one processor; and
at least one memory including computer program code;
the at least one memory and the computer program code configured to cause the apparatus at least to:
receive, by a network node of a wireless network from a user equipment in the wireless network, a message indicating at least one region of a victim frequency band that has a smaller maximum sensitivity degradation (MSD) value than a MSD value in another region of the victim frequency band, wherein the network node controls a cell associated with a frequency band combination including an aggressor frequency band and the victim frequency band.

14. The apparatus according to claim 13, wherein the at least one memory and the computer program code configured to cause the apparatus at least to:
receive, from the user equipment, an indication that the user equipment is able to support a request for information about a region of the victim frequency band having a low MSD value; and
transmit, to the user equipment, the request for the information about the region of the victim frequency band having the low MSD value;
wherein the message is received from the user equipment in response to the request.

15. The apparatus according to claim 13, wherein the at least one memory and the computer program code configured to cause the apparatus at least to:
determine uplink power and user equipment scheduling of time and frequency resources based on the at least one region of the victim frequency band that has the smaller MSD value.

16. A method, comprising:
receiving, by a network node of a wireless network from a user equipment in the wireless network, a message indicating at least one region of a victim frequency band that has a smaller MSD value than a MSD value in another region of the victim frequency band, wherein the network node controls a cell associated with a frequency band combination including an aggressor frequency band and the victim frequency band.

17. The method according to claim 16, further comprising:
receiving, from the user equipment, an indication that the user equipment is able to support a request for information about a region of the victim frequency band having a low MSD value; and
transmitting, to the user equipment, the request for the information about the region of the victim frequency band having the low MSD value;
wherein the message is received from the user equipment in response to the request.

18. The method according to claim 16, further comprising:
determining uplink power and user equipment scheduling of time and frequency resources based on the at least one region of the victim frequency band that has the smaller MSD value.

\* \* \* \* \*